United States Patent [19]

Vachenauer et al.

[11] 4,319,243
[45] Mar. 9, 1982

[54] AIRPORT-SURVEILLANCE SYSTEM

[75] Inventors: Erwin Vachenauer, Haar; Gerhard Wagner, Waakrichen; Bernd Mueller, Poecking, all of Fed. Rep. of Germany

[73] Assignee: Siemens Aktiengesellschaft, Berlin & Munich, Fed. Rep. of Germany

[21] Appl. No.: 119,792

[22] Filed: Feb. 8, 1980

[30] Foreign Application Priority Data

Mar. 22, 1979 [DE] Fed. Rep. of Germany ....... 2911313

[51] Int. Cl.$^3$ ............................................. G01S 13/78
[52] U.S. Cl. ............................ 343/6.5 R; 343/112 TC
[58] Field of Search ........ 343/6.5 R, 6.5 LC, 112 TC

[56] References Cited

U.S. PATENT DOCUMENTS

| 3,757,340 | 9/1973 | Rogoff ............................ 343/112 R |
| 3,870,994 | 3/1975 | McCormick et al. ............ 343/6.5 R |
| 4,060,805 | 11/1977 | McComas ...................... 343/6.5 LC |
| 4,109,248 | 8/1978 | Knowles et al. ................ 343/6.5 R |
| 4,137,531 | 1/1979 | Pell ................................. 343/6.5 R |

OTHER PUBLICATIONS

Electronics; May 13, 1976; p. 34.
Klass; Technique Pinpoints Aircraft on Airports; Aviation Week & Space Technology; Jun. 28, 1976; pp. 67, 73.
Griffiths; Secondary Radar for Ground Movement Control; Agard Conference Proceedings; No. 188 by Quelle; pp. 20-2, 21-12.

Primary Examiner—T. H. Tubbesing
Attorney, Agent, or Firm—Hill, Van Santen, Steadman, Chiara & Simpson

[57] ABSTRACT

An airport-surveillance system for determining the position and identification of aircraft (4) on the airfield which utilizes secondary radar and includes an interrogation station (1) installed on the airfield (3) and from which the interrogation signal is transmitted by way of a narrow sharply forcused beam of an antenna which scans the airfield and further includes transponding stations installed in the aircraft (4). The present invention provides accurate identification and location of the aircraft by utilizing a receiver which has a sharply focused antenna beam and which is geographically located a distance away from the interrogation antenna and wherein the replies from the transponder of the aircraft are received by the receiving antenna only when the interrogation and receiving antenna beams (2, 22) intersect. By scanning all locations of the airport, the position and identification of all aircraft on the airport can be determined. A modification of the invention provides that instead of or in addition to the receiving station having a narrow beam antenna a number of receivers (5, 6 and 7) having omni-directional receiving antennas can be mounted at different locations on the airfield for determining the aircraft positions by using hyperbola locating techniques. The airport surveillance system of the invention is particularly suitable for large airports.

3 Claims, 3 Drawing Figures

AIRPORT-SURVEILLANCE SYSTEM

BACKGROUND OF THE INVENTION

1. Field of the Invention

This invention relates in general to airport surveillance systems for determining the position and identification of aircraft on the field which utilizes secondary radar including an interrogation station with a narrow transmitting beam and includes one or more receiving stations mounted at different locations on the airport which receive transponded signals from the aircraft.

2. Description of the Prior Art

It is intended that in the future airports will be equipped with a new landing system which allows air traffic to land and take off even under very poor visibility conditions. The aircraft controllers must also ensure the proper and safe operation of aircraft traffic on the landing field before it has landed and after it has landed under conditions of poor visibility where often times they may not be able to visually see and identify the aircraft. This makes it necessary that a system be installed which allows surveillance of the movement and operation of the aircraft on the flying field under poor visibility conditions and requires that the positions and the identity of the aircraft are continuously presented on a suitable display means.

Several large airports are equipped with high resolution primary radar such as X-band radar systems for the surveillance of the airfield. However, such high resolution radar has the disadvantage that when the wave length becomes shorter, the detection and discovery probability particularly in the event of heavy rainfall is not sufficient and also such systems do not provide for the identification of the aircraft.

It is also possible for airfield surveillance to install on the runways sensors as, for example, inductive loops, leader cables, radar sensors, infrared or pressure sensors. However, sensors of this type monitor only the runways and not the remaining portion of the fields such as the taxiways and entail very high expenses for the systems.

Airfield surveillance can also be accomplished with secondary radar. When using secondary radar, the position as well as the identification on the entire airport field is possible. However, difficulties arise because with existing secondary radar surveillance systems the reply messages have a comparatively long duration so that the replies of the transponders mounted on the aircraft overlap within the airfield.

An airport surveillance system from Great Britain is discussed in "AGARD Conference Proceedings," No. 188, Article 21 and describes secondary radar system which in order to resolve a reply from the airplane transponder utilizes two pulses ($P_1$, $P_3$) with a defined time spacing. On the airfield, two transmitting stations are installed and one emits the pulse $P_1$ with a directional antenna and the other transmitting station emits the pulse $P_3$ with an omni-directional antenna pattern. At specified locations on the airfield, the time condition for the acceptance of the interrogation in the transponder is satisfied. If an airplane is located at that instant at such location, then its transponder will transmit a reply. By using this technique, the airfield can be scanned such that always only one transponder replies. A receiver located at the edge of the airfield decodes the reply and the position of the airplane can be determined from the angular position of the directional radiated beam and the adjusted time intervals between the two pulses $P_1$ and $P_3$. In the English system, the precision of the location of the aircraft can be improved by utilizing hyperbolic techniques. Since the area in which the transponder of the aircraft is relatively large, overlapping can occur from replies from more than one aircraft.

A U.S. airport surveillance system described in "AGARD Conference Proceedings," No. 188, Article 22 utilizes secondary radar for the selection of the individual airplanes and utilizes Ingterrogation Path Side Lobe Suppression (ISLS). If the amplitude of the reference level pulse $P_2$ is greater than the amplitude of the first interrogation pulse $P_1$ then no reply will be transmitted by the transponder on the respective aircrafts. Two interrogation stations scan the airfield using monopulse antennas. Only at the intersection point of the two beams is the amplitude of the pulse $P_2$ smaller than the amplitude of the pulse $P_1$ so only from this location will a transponded reply be emitted. Position determination is accomplished with the use of receivers wherein the transit time or time delay differences of the received signals are detected and used to calculate position. Due to reflections which cause the level of the pulse $P_2$ to be greater than that of pulse $P_1$ such as from other aircraft or buildings, areas exist in which it is not possible to locate the aircraft.

Other systems which function with the selection of individual airplanes using ISLS techniques are described in the journal "Aviation Week & Space Technology," of June 28, 1976, pages 67 through 73. Also, the journal "Electronics," of May 13, 1976, page 34 discusses a system. See also German OS 2,538,382. These airport surveillance systems have areas in which location of aircraft is not possible.

SUMMARY OF THE INVENTION

It is an object of the present invention to provide an airport surveillance system which makes it possible in all instances to precisely locate aircraft and ground vehicles on the airfield and to identify them. According to the invention, the aircraft and/or vehicles send out transponded reply signals which are received at a seond location different from the transmitting location with a receiver having an antenna which also has a narrow beam and in which the second antenna beam also scans the airfield such that the overlapping of the radiation lobes of the transmitting and the receiving antenna can be controlled to scan every location on the airfield so that the position of the aircraft can be determined.

In systems according to the invention, secondary radar transponders already installed in the aircraft are utilized. The system utilizes an interrogation station which transmits interrogation signals over a narrow beam antenna and utilizes a receiving station which has a narrow beam antenna which receives the transponder replies from the aircraft. At the receiving station, a reply will arrive from an aircraft only when the aircraft or other vehicle is located in the intersection zone of the interrogation and the receiving lobes of the antennas. By this manner, the airfield can be scanned in a point by point manner and the emitted reply codes from aircraft or other vehicles will be individually detected. For example, ground vehicles which are equipped with transponder equipment such as, for example, tank vehicles or fire fighting vehicles can also be detected in the same manner as aircraft. The position of the overlapping zone of the two antenna beams will indicate the position of the interrogated aircraft or vehicle. The narrower the antenna lobes are made, the more precise will be the position determination.

The objects of the invention can also be accomplished if the reply signals from the transponders on the aircraft and vehicles are received by two or more omni-directional antennas suitably mounted to be distributed on the airfield and geographically set apart from the interrogation antenna and transmitter and wherein the time delay or transit time differences of the reply signal to the individual omni-directional antennas is detected and the position of the respective airplane or vehicle is calculated utilizing hyperbolic location or position finding techniques.

An improvement in the precision with regard to position determination is achieved because the reply signals from the transponding stations are received with a second antenna which is geographically mounted away from the interrogation antenna and which also has a narrow beam and which narrow beam of the receiver scans the airfield so that the radiation beams of the transmitting and receiving antennas can be controlled such that the overlapping zones successively detects every point on the airfield. This makes it possible that with the use of the overlapping zone that a first position determination of the aircraft or land vehicle can be accomplished and reply signals from the vehicles are also received by two or more omni-directional antennas and receivers mounted on the airfield and geographically set apart from the interrogation transmitting antenna and wherein the time delay or transit time differences of the reply signals received at the individual omni-directional antennas allows the position of the respective aircraft or vehicle to be determined using hyperbolic position determining techniques.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
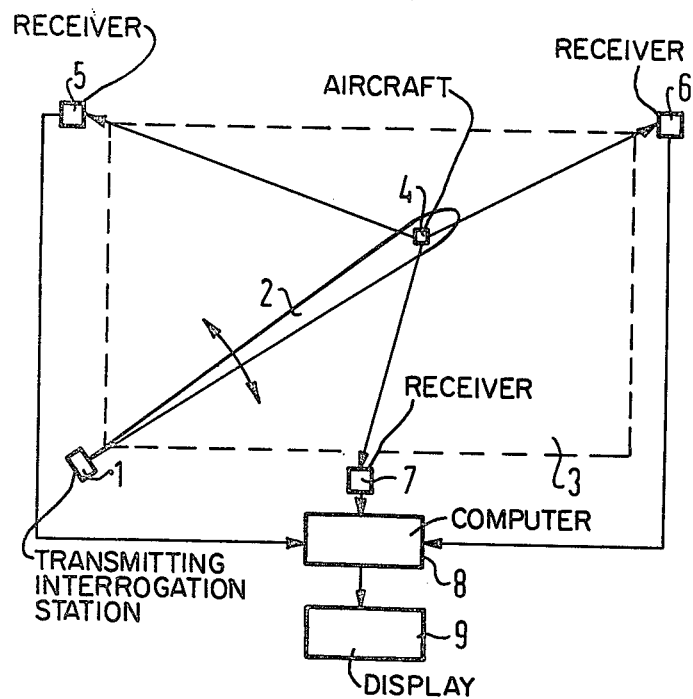
FIG. 1 is a block plan diagrammatic view of an airport surveillance system using secondary radar having three receivers mounted on the edge of the airfield.

FIG. 1 illustrates the airport surveillance system of the invention where a transmitting interrogation station 1 has an antenna which produces a narrow beam 2 that can be scanned over the entire airport. The beam width of the lobe of the antenna 2 should be in the order of 2° and the interrogating beam 2 scans the airfield and when the beam 2 intercepts an aircraft 4 which is equipped with a transponder, the transponder of the aircraft will produce and radiate a reply. The radiated reply signal from the airplane 4 is received by three separate receivers 5, 6 and 7 mounted on the edge of the airport at different geographic locations as shown. The time delay or transit time differences of the reply signals received at the receivers 5, 6 and 7 indicates the position of the aircraft 4 and the output of the receivers 5, 6 and 7 are supplied to a computer 8 for calculating the position of the aircraft 4 and the position is supplied to a display means 9. The geometric location of a constant time delay or transit time difference produces a hyperbola and from the intersection of three hyperbola curves the position of the signal source on the aircraft 4 is determined. The reply code of the transponder comprises an identification code which identifies the particular aircraft 4. The allocations of the code to specific airplanes is made in advance in a well known manner. The position and the identification code of the respective airplane 4 are presented on the display field 9. By swinging or rotating the interrogating beam 2 all airplanes on the field 3 will be successively detected and their positions calculated and their identification and position displayed on the display means 9. The computer 8 may be of the type disclosed in U.S. Pat. No. 3,757,340 which calculates the position of the aircraft from the transmitted signals from the time delays and transit times as determined by the several receivers. A problem arises due to the fact that the interrogating beam 2 can also intercept several aircrafts and actuate their responders so that a number of replies may coincide or merge into each other due to the small airplane spacings. If a synchronous overlap occurs, in other words, if the time slot patterns of the individual codes coincide, erroneous and confusing information can occur. So as to prevent this as much as possible specific measures are possible and one of these involves the use of a special interrogation antenna.

The narrower the beam of the interrogating antenna, the smaller the probability that a plurality of transponders will simultaneously reply. So as to realize extremely narrow interrogation beams 2 antennas having large apertures are required. In an expedient manner, the use of an electronically phase controlled antenna can be used for this purpose. Such an antenna has the advantage that the mechanical rotation or pivoting of the antenna can thus be eliminated.

Another method for interrogation, side lobe signal suppression, utilizes the emission of interrogation pulses P1 and P3 which are transmitted by the directional antenna of the interrogation station 1 and a P2 refernce level pulse is transmitted with an omni-directional antenna. The beam width can be narrowed by using a large aperture directional antenna.

Figure 2:
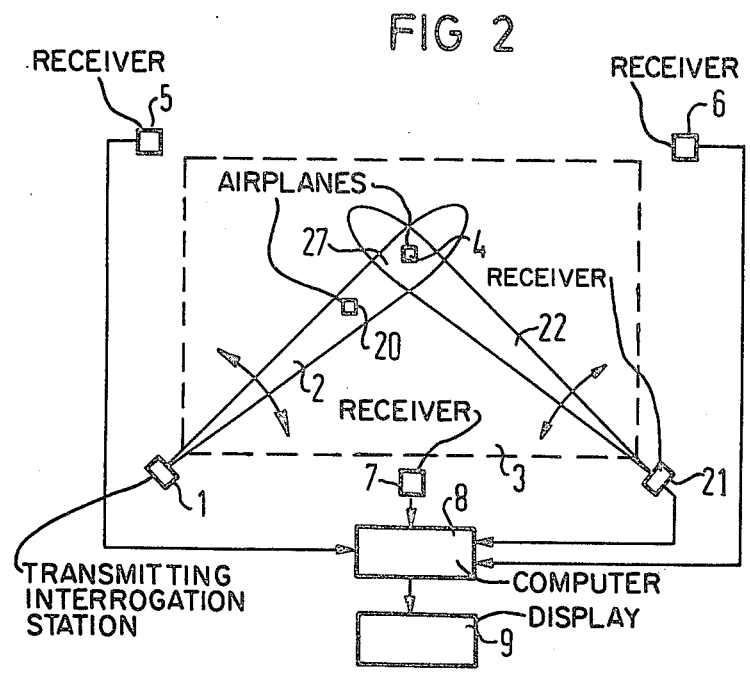
FIG. 2 is a top plan diagrammatic view of an airport surveillance system utilizing four receivers with one having a very narrow antenna beam.

With the use of narrow beams it is possible that airplanes which vary only slightly in azimuth can be individually interrogated. If, however, two or more aircraft are located one behind the other in the radial direction relative to the interrogation station the several aircraft will reply to a single interrogation. The system disclosed in FIG. 2 prevents multiple aircraft from responding to an interrogating signal. The fundamental concept of the system of FIG. 2 is that a narrow beam antenna is utilized for at least one of the receivers 21 as well as for the transmitting station 1. The interrogation beam 2 of the interrogation station 1 scans the airfield in steps of 1°, for example, and if the interrogation beam 2 points in the direction in which two airplanes 4 and 20 are located so that non-decodable interlaced replies arrive at the receivers 5, 6 and 7, then an additional receiver 21 is activated. The receiver 21 has a narrow beam 22 which continuously scans the area of the interrogation beam 2 and first detects the aircraft 4 and later the aircraft 20. The separate code information of the aircraft 4 and the aircraft 20 are then detected in the receiver 21. The position coordinates of the two aircrafts can be obtained in this case from the instantaneous position of the overlapping zone 27 of the two antenna lobes 2 and 22. The determination and calculation of the airplane local coordinates occurs in the computer 8 and the position and identification of the individual airplanes or vehicles 4 and 20 can be displayed on the display device 9. U.S. Pat. No. 3,757,340 discloses a computer which can be utilized for the computer 8 illustrated in FIG. 2.

Figure 3:
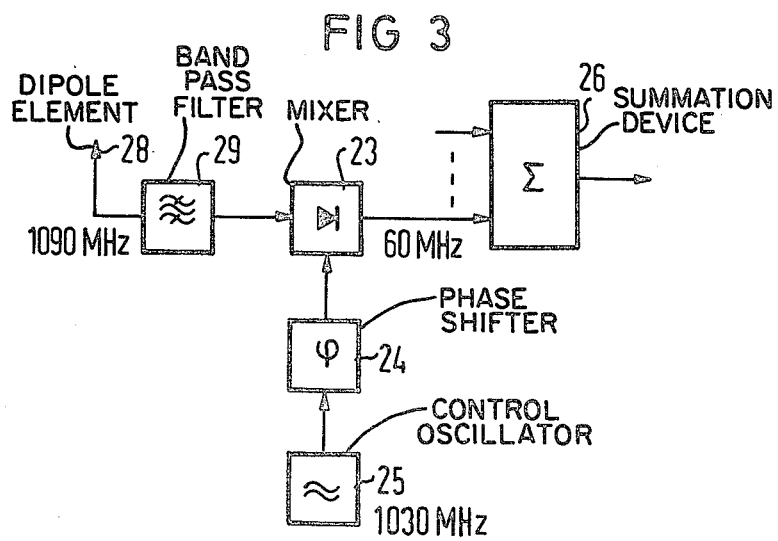
FIG. 3 comprises a block circuit diagram of a module of a phase control to receiving antenna for producing the sharply focused narrow beam receiving lobe of the antenna of FIG. 2.

FIG. 3 illustrates a receiving module of a phase controlled antenna for the receiver 21 according to FIG. 2. A band pass filter 29 is connected to a dipole element 28 and a signal as, for example, at 1090 MHz is supplied to a mixer 23 in which the 1090 MHz signal is converted to 60 MHz due to its mixing with a signal of 1030 MHz from a control oscillator 25 that supplies an input to the mixer 23 through the phase shifter 24. The phase shifter is a controllable phase shifter and by varying the phase of the input to the mixer 23 swinging or rotation of the receiving lobe 22 can be accomplished. The 60 MHz signals for the individual receiving elements are supplied to a summation device 26. Since the signals of the direction of maximum radiation are in phase, they provide the greatest summation signal and this allows the directional effect and directivity of the antenna array to be obtained.

Since the receiving characteristic of such an antenna also has side lobes, the known method for incoming path side lobe signal suppression, RSLS, can be expediently employed. So as to reduce cost, it is advantageous to employ a method for beam sharpening such as monopulse. See the article entitled "Increasing the Traffic Capacity of Transponder Systems" in IRE National Convention Rec. Vol. 6, Part 5, 1958, pages 80–93 and in particular pages 85 and 86.

The two antenna lobes 2 and 22 illustrated in FIG. 2 are controlled such that every point of the airfield is scanned. If an airplane 4 is located in the overlapping or intersection zone 27 of the two beams of the antennas, the reply of the transponder associated with the airplane 4 will be accepted by the receiver 21 and decoded. Since the position of the overlapping zone 27 of the two beams 2 and 22 is known, the location of the airplane 4 is determined. The precision of the position determination in this method is not quite as high as the resolution of the time delay or transit time differences by the means of the receivers 5, 6 and 7 so that a combination of the two systems presents an optimum solution of the problem.

Although the invention has been described with respect to preferred embodiments, it is not to be so limited as changes and modifications may be made which are within the full intended scope of the appended claims.

We claim as our invention:

1. Airport monitoring system for determining the flying field position and the identification of airplanes carrying transponders, or the like, pursuant to the utilization of secondary radar with first and second antennas which have narrow radiation lobes scanning the flying field and arranged at a suitable distance from each other on the flying field, and said radiation lobes of said two antennas are controllable so that their overlapping zone successively searches each area of the flying field and whereby the interrogation signal is transmitted by said first antenna (1) and second antenna (21) is a receiving antenna for receiving a signal from an airplane transponder.

2. Flying field-monitoring system according to claim 1 characterized in that said first and second antennas (1, 21) are electronically phase-controlled antennas.

3. Airport monitoring system according to claim 1 characterized in path side lobe signal suppression means are provided for said first antenna (1) and for said second antenna (21).

* * * * *